US010509988B2

(12) United States Patent
Woulfe et al.

(10) Patent No.: US 10,509,988 B2
(45) Date of Patent: Dec. 17, 2019

(54) CRIME SCENE ANALYSIS USING MACHINE LEARNING

(71) Applicant: MICROSOFT TECHNOLOGY LICENSING, LLC, Redmond, WA (US)

(72) Inventors: Muiris Woulfe, Dublin (IE); Andreas Balzer, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 15/678,518

(22) Filed: Aug. 16, 2017

(65) Prior Publication Data

US 2019/0057286 A1   Feb. 21, 2019

(51) Int. Cl.

| | |
|---|---|
| G06K 9/62 | (2006.01) |
| G06Q 50/26 | (2012.01) |
| G06K 9/36 | (2006.01) |
| G10L 15/02 | (2006.01) |
| G11B 27/10 | (2006.01) |
| H04N 21/4415 | (2011.01) |
| H04N 5/00 | (2011.01) |
| H04N 5/14 | (2006.01) |

(52) U.S. Cl.
CPC ............. *G06K 9/6277* (2013.01); *G06K 9/36* (2013.01); *G06Q 50/265* (2013.01); *G10L 15/02* (2013.01); *G11B 27/102* (2013.01); *H04N 21/4415* (2013.01); *H04N 5/00* (2013.01); *H04N 5/147* (2013.01)

(58) Field of Classification Search
CPC ...... G06K 9/36; G06K 9/6277; G06Q 50/265; G10L 15/02; H04N 5/00; G11B 27/102

USPC ........ 702/181, 183, 188; 42/70.09; 340/540; 367/124, 129; 701/1

See application file for complete search history.

(56) References Cited

U.S. PATENT DOCUMENTS

| | | |
|---|---|---|
| 6,281,792 B1 | 8/2001 | Lerg et al. |
| 8,385,154 B2 | 2/2013 | Khan et al. |

(Continued)

OTHER PUBLICATIONS

Chen, et al., "Audiovisual Gunshot Event Recognition", In Proceedings of IEEE International Conference on Systems, Man and Cybernetics, Oct. 8, 2006, pp. 4807-4812.

(Continued)

*Primary Examiner* — John H Le
(74) *Attorney, Agent, or Firm* — Newport IP, LLC; Michael C. Johnson

(57) ABSTRACT

Technologies are provided for automated crime scene analysis using machine learning. Firearm models, types, or even specific firearms may be automatically detected from captured audio files or continuous audio streams (e.g., recording microphones) using machine learning techniques. The detection may also be based on (or enhanced by) captured still images or video files/streams. Further information such as crime scene layout, wound types and locations, and similar information may be provided to the analysis service through manual input or automated capture (e.g., through analysis of image/video data). A number of firearms used in the commission of the crime may also be detected. Specific firearm types may be associated with specific crime types. Similar techniques may also be used to detect and classify types and quantity of explosive material.

20 Claims, 8 Drawing Sheets

(56) References Cited

U.S. PATENT DOCUMENTS

| | | |
|---|---|---|
| 8,887,430 B2 | 11/2014 | Wichner |
| 9,615,066 B1 | 4/2017 | Tran et al. |
| 2002/0003470 A1 | 1/2002 | Auerbach |
| 2009/0182524 A1 | 7/2009 | Stephanson |
| 2012/0300587 A1 | 11/2012 | Azimi-Sadjadi et al. |
| 2015/0070166 A1 | 3/2015 | Boyden et al. |
| 2015/0071038 A1 | 3/2015 | Boyden et al. |
| 2018/0025636 A1* | 1/2018 | Boykin ............... G11B 27/102 701/1 |
| 2018/0053394 A1* | 2/2018 | Gersten ............... G08B 25/10 |

OTHER PUBLICATIONS

Valenzise, et al., "Scream and Gunshot Detection and Localization for Audio-Surveillance Systems", In Proceedings of IEEE Conference on Advanced Video and Signal Based Surveillance, Sep. 5, 2007, pp. 21-26.

* cited by examiner

CRIME SCENE ANALYSIS USING MACHINE LEARNING

BACKGROUND

Much of modern crimes involve firearms and/or explosives. Typical crime scene analysis includes manual analysis by "experts", which may be vulnerable to subjective interpretations, disputes in court, etc. Despite an increasing number of electronic devices that can capture information associated with a crime or crime scene, crime scene analysis is still heavily reliant on manual processes.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to crime scene analysis using machine learning. An analysis service may receive captured and/or manually input data associated with a crime scene such as audio data, video data, still image(s), and other data. One or more servers may be queried for catalogued information associated with firearms, explosive materials, and/or other crime scene aspects. For example, characteristic shot sounds of different firearm models may be queried to determine a firearm used at a crime scene based on a captured audio of the firearm shot(s). The analysis service may then determine the type of or the specific firearm or explosive material using a machine learning approach based on the captured data and the catalogued information. Results may include identification of firearms or explosives used in the commission of a specific crime, a comprehensive analysis of the crime scene, and/or feedback to the machine learning process or the catalogued information database to enhance accuracy.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
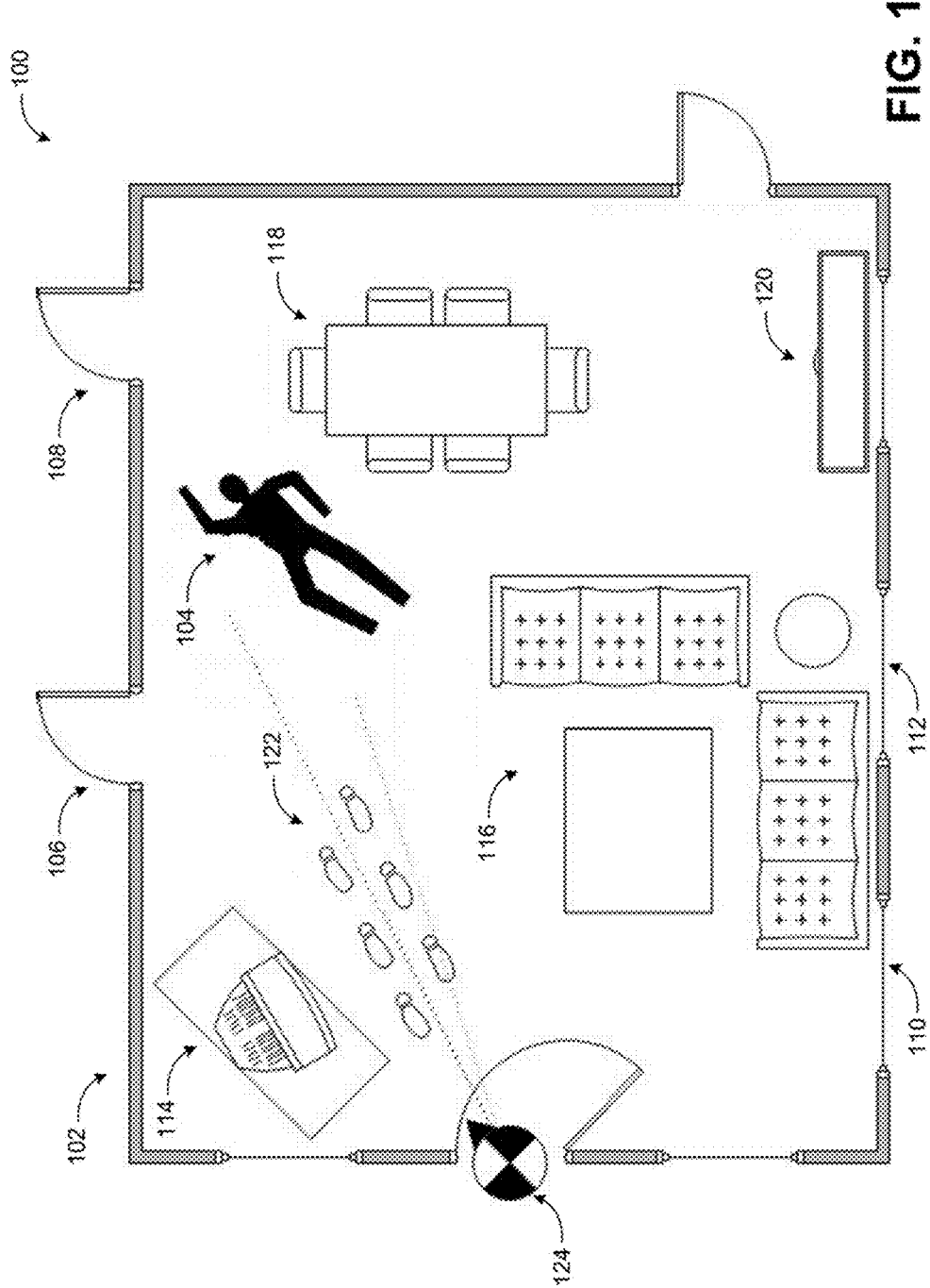
FIG. 1 is a conceptual diagram illustrating an example crime scene.

As briefly described above, crime scene analysis may be performed using machine learning. In some examples, firearm models, types, or even specific firearms may be automatically detected from captured audio files or continuous audio streams (e.g., recording microphones, microphone arrays. etc.) using machine learning techniques. The detection may also be based on (or enhanced by) captured still images or video files/streams. Further information such as crime scene layout, wound types and locations, and similar information may be provided to the analysis service through manual input or automated capture (e.g., through analysis of image/video data). Floor plans, location of microphones and cameras, and data on vibrations/pressure in air for explosions may be further examples of additional data that may be automatically captured or manually provided. Input data may be pre-processed, for example, to filter out extraneous noise or scenes in audio/video files. In addition to the types, models, or specific firearms detection, a number of firearms, or even types of bullets used in the commission of the crime may also be detected.

Sound records of firearms recorded at manufacturing stage, for example, may be queried to compare with the captured data in identifying individual firearms. For example, procedures may be instigated for recording the unique audio profile of each firearm at purchase (or before sale) with the results stored in law enforcement databases. This may allow for linkage of the record for a firearm (including registration number and owner details) to a crime. Firearm sounds may be clustered to group firearms by their unique audio fingerprint. Specific firearm types may be associated with specific crime types using machine learning. Similarly, wound types and locations may be determined from the sound of the impact (e.g., likely to have hit, whether the hit is to a bullet-proof vest, etc.). Wound types and locations may also be associated with specific firearms allowing predictive analysis and or input for protection mechanisms. Similar techniques may also be used to detect and classify types and quantity of explosive material.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing crime scene analysis. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, keyboard input, and other comparable means of interaction. An application programming interface (API) may be a set of routines, protocols, and tools for an application or service that enable the application or service to interact or communicate with one or more other applications and services managed by separate entities.

FIG. 1 is a conceptual diagram illustrating an example crime scene.

Diagram 100 shows a room 102 as a crime scene. A murdered person 104 and shoe prints 122 appear to be the only visible evidences of the crime. In a crime scene, elements of the environment such as ingress and egress points (doors 106, 108, windows 110, 112, etc.), furniture and other fixed or movable items (television 114, table 118, sitting area 116, cabinet 120, etc.) may play a role in the crime scene analysis. For example, if a firearm is used in the commission of the crime, stray bullets may be stuck in some of the fixed or movable items. Composition, size, position of each element in the environment may affect the impact of the bullet or explosion. A perpetrator's actions may be influenced by the elements of the crime scene environment. Thus, each element may need to be identified (composition, size, position) for an accurate analysis.

Figure 2:
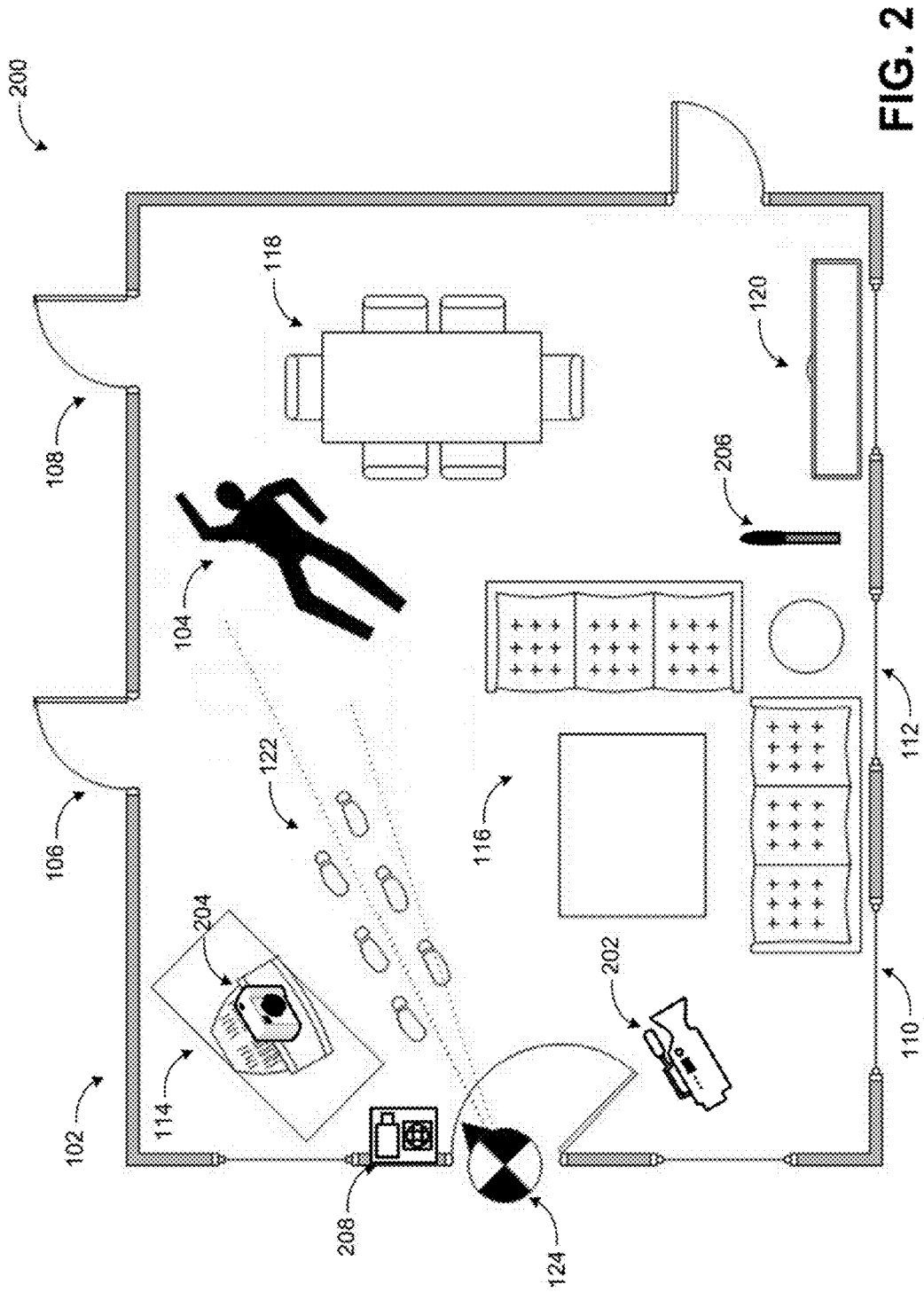
FIG. 2 is a conceptual diagram illustrating an example crime scene with potential devices to capture data associated with the commission of the crime that may be used in the crime scene analysis according to some embodiments.

FIG. 2 is a conceptual diagram illustrating an example crime scene with potential devices to capture data associated with the commission of the crime that may be used in the crime scene analysis according to some embodiments.

In diagram 200, the elements of the room 102 that is the crime scene are similar to those in FIG. 1. In addition, devices that may assist in capturing crime scene data such as still image camera 204, access entry system 208 (optionally with a camera), microphone 206, and video camera 202 may be used to capture audio, image, video, and other data associated with the crime scene. In some examples, the layout of the crime scene may be inferred or otherwise deduced from the data captured by the devices. Floor plan data may also be manually provided during setup of the system or analysis of the scene. In other examples, the layout of the crime scene may impact the data captured by the devices and may be taken into account when analyzing the data. For example, presence of certain size and composition elements (e.g., highly reflective and large furniture pieces) may affect how sound is received at a microphone. The distortive or otherwise modifying effect of the surrounding items may be considered when analyzing sounds captured by the microphone in determining a particular type or model of firearm based on the captured sounds. Empty spaces may also be taken into account. For example, empty bathrooms yield an extreme echo when talking; the same may also apply to firearm shoot/bullet impact/explosion sounds.

While diagrams 100 and 200 show a room and a single person crime scene, that is for simplified illustration purposes. Embodiments may be implemented in any type of crime scene. Indeed, larger, outdoor crime scenes may be a more common environment. In such locations, a number of data capture devices such as closed circuit television (CCTV) systems, microphones, security system devices, and even bystander smartphones, etc. may be used to capture audio, video, and other data associated with the crime.

The collected/captured data may be used in a machine learning model along with existing (catalogued) data to analyze the crime scene, determine number/type/model of firearms used, type/amount of explosive material used, etc. Results of the analysis may also be employed in updating existing information databases, enhancing accuracy of machine learning models, generating various types of reports, etc.

Figure 3:
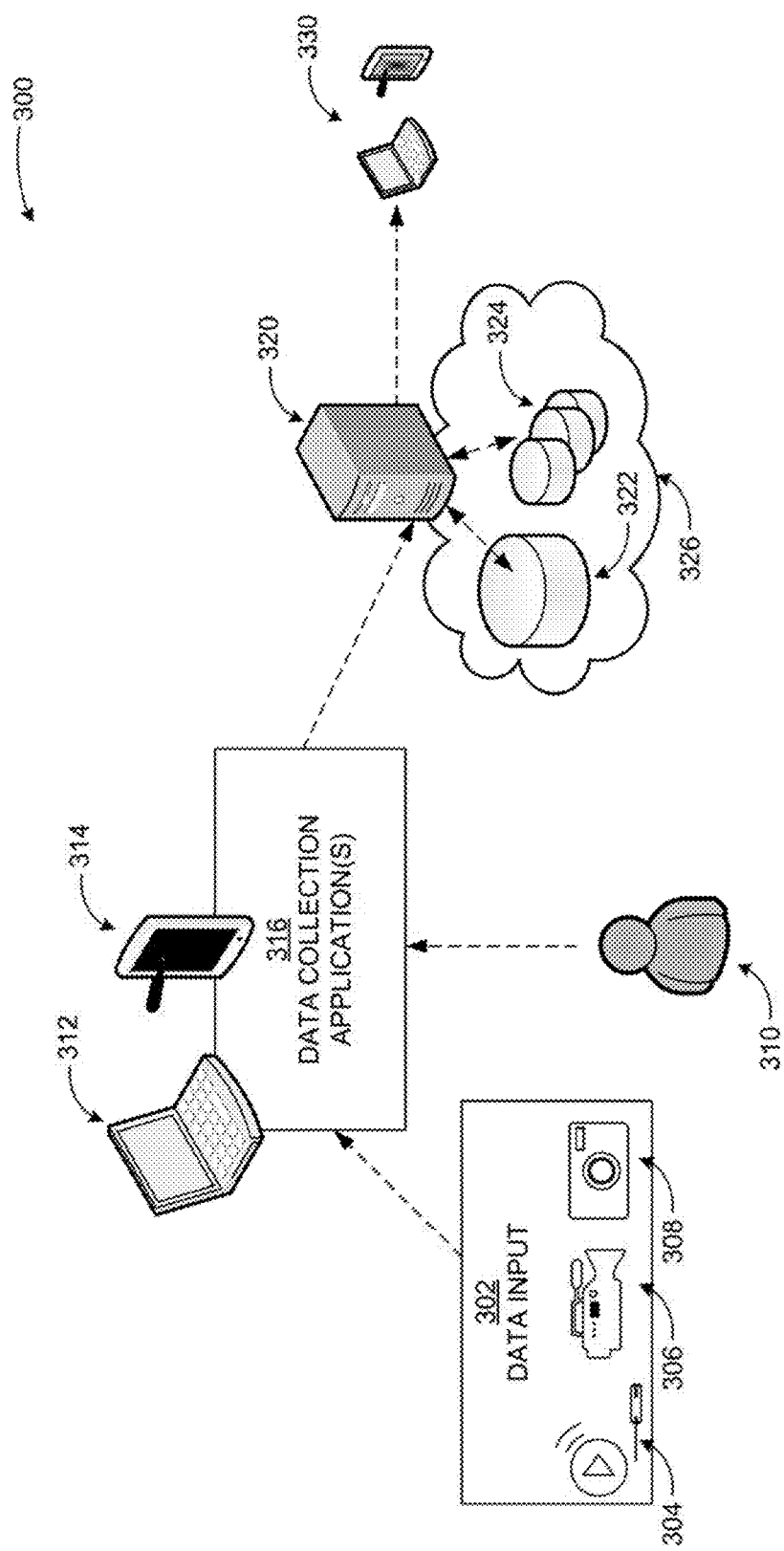
FIG. 3 is a display diagram illustrating example components of a system for crime scene analysis according to embodiments.

FIG. 3 is a display diagram illustrating example components of a system for crime scene analysis according to embodiments.

A system for performing crime scene analysis using machine learning may include a number of components and topographies. The example system in diagram 300 is provided for illustration purposes only and is not intended to indicate any limitation on embodiments. The example system may include a number of data input 302 devices such as audio capture devices 304, video capture devices 306, and still image capture devices 308. For example, in a large crime scene environment such as a public place, a number of CCTV cameras, security cameras, stationary microphones, or even smart phones and similar devices used by the people at the crime scene may be used as data input 302 devices. Further examples may include body cameras worn by law enforcement officials and comparable devices.

Data from the data input 302 devices may be received (or retrieved) by one or more servers 320 of the system directly or via one or more data collection applications 316 executed on various computing devices 312, 314, etc. For example, a crime scene technician may download captured audio or video data from a data capture device to their tablet computer, enter notes (e.g., number of found bullets, general layout information, environmental information such as temperature/humidity, and any comparable/relevant information) about the crime scene, and then upload the entire information to the server 320. In another example, the one or more servers 320 may query data capture devices at the crime scene and download captured data automatically. Various users (e.g., user 310) such as crime scene technicians, law enforcement officials, private security personnel, etc. may provide additional input data (e.g., crime scene layout information, witness statements, etc.). User 310 may interact with the data collection applications 316 with a keyboard based input, a mouse based input, a voice based input, a pen based input, and a gesture based input, among others. The gesture based input may include one or more touch based actions such as a touch action, a swipe action, and a combination of each, among others.

The one or more servers 320 may process the received data (captured or otherwise input) using one or more machine learning based approaches. The system may retrieve information such as catalogued data (audio, video, and other data) associated with different firearms, explosive devices, and/or crime scene investigations. Comparing the catalogued data to the received data and analyzing for similarities and/or distinctions, the system may determine a number of, a type of, and a model of the firearms used in the crime and/or a type and amount of explosive material used in the crime. Catalogued information may be received/retrieved from a number of individual sources 324 or from a central database 322. Servers of the system and data sources may communicate over public or private networks, may be cloud based (326), or may follow other topologic configurations.

Machine learning approaches used by the system may include, but are not limited to, supervised learning systems, Bayesian networks, neural networks, decision tree based systems, unsupervised learning systems, cluster analyses, anomaly detection systems, reinforcement learning systems, and deep learning systems. Results of the processing (analysis) may be provided as identification of the involved firearms and/or explosives to designated people via their computing devices 330, updating of catalogued data stores 324, updating of the central database 322, and even updating of the employed machine learning system. Further outputs of the system may include, but are not limited to, a number of shots fired, a number of explosions, timings of the different shots/explosions, number of distinct voices heard, what was said, etc.

According to some examples, a machine learning model such as a neural network may be constructed and trained. Training may involve feeding a set of firearm shot recordings as audio files, each tagged with the firearm model, for example. The audio files may be filtered by trimming to just the shot with no extraneous leading or trailing silence or background sound, by removing background sound during the shot, by normalizing the audio gain to a standardized value, and/or by removing echo and/or reverberation among other adjustments. In addition, the system's computational requirements during training may be reduced by simplifying the audio to selected frequencies and/or the amplitude (volume). Other aspects of the audio may also be selected for analysis. An uncompressed audio file (e.g. WAV format) may be desirable as the number of bits in the file for a given timeframe remain constant, substantially simplifying the model. Compressed formats (including compressed lossless formats) such as MP3 contain variable length sequences that may typically require extraction before processing. The tag may typically be encoded using a one-hot format, which may comprise a vector whose length equals the number of firearm models, with each element set to 0 or 1 depending on whether the firearm is of the model associated with that vector element. After feeding the model with a large volume of data, a model of sufficient accuracy may be generated. Another example model may be trained based with each vector element set to between 0 and N, where each element is a positive integer specifying the amount of shots corresponding to that particular firearm model or type.

Upon completion of the training phase, a firearm model may be detected within existing audio files during an evaluation phase. The audio files used for evaluation may be cleaned/simplified similarly to those used during training. The cleaning/simplification may be performed automatically or manually. If performed automatically, the firearm shots may be extracted by monitoring sudden or significant changes of amplitude (volume) in a file or within a continuous audio stream/audio from a video stream, or through finding characteristic audio profiles (for example, indicated through a defined shape in waveform views). The cleaned and simplified audio may then be provided to the machine learning model, which may process the file to determine a most probable firearm associated with the noise.

An output of the machine learning model may be a vector similar to the input vector indicating the firearm model with one element for every possible firearm model. The value of each may typically be a normalized percentage of the probability of the audio being of the corresponding firearm model. Alternatively, some machine learning models may output just 0 or 1 as they internally make the decision as to whether the likelihood passes the model's threshold (based on earlier training). The result may be provided to the user through a user interface (UI) as the probable firearm with or without a percentage of certainty, or all models and probabilities may be provided if desired. For example, top 5 likely firearms or all firearms with higher than 50% likelihood may be presented. In other examples, firearm types (e.g., assault rifle, handgun, etc.) may be provided instead of specific models. The model may be trained with firearm types (along with specific firearm models or just with the types). Alternatively, a conversion may be made from model to type of firearm after the analysis. The latter approach may be employed, for example, if there's a similar probability of two different firearm models being used, but with uncertainty as to which one.

The approach described above may provide accurate results, but may involve some post-processing of recorded audio to extract the firearm shots and performance of analyses on these (e.g., simple processing until a gunshot or similar event is detected, then post-processing). The additional processing may be acceptable for cases such as police investigating evidence of previous crimes, but may present a challenge in facilitating continuous monitoring for possible crimes, for example. Post-processing may not be too time-consuming, so the delay between a shot and the results of the above-discussed model may be no more than a few seconds or less, but the potentially discrete elements may make this more challenging to run in a continuous fashion.

In further examples, a continuous model may be employed. This model may use a machine learning approach focused on sequences, such as a Recursive Neural Network (RNN) or especially a Long Short-Term Memory (LSTM). The model may be trained by inputting a continuous audio form with each discrete interval (e.g. each millisecond) marked as containing a firearm shot by a particular firearm model or marked as containing no firearm shot. The model may use the history of what has come before each interval to determine whether the current interval contains a firearm shot, with greater weights applied to more recent intervals than those further away.

During evaluation, the model may also be fed continuous audio and may output the presence or not of a firearm and the firearm model at each interval. The audio may also be cleaned/simplified as proposed previously, although any pre-/post-processing may lead to additional delays and the impact of these on the overall system performance may be considered. However, some cleaning/simplification operations may improve model performance and therefore lead to end-to-end performance improvements despite the extra time needed to perform them.

By using several microphones or one or more microphone arrays and a configuration indicating the spatial location of the microphones, the system may infer the number of guns of the same type depending on the sound wave distribution of various gun shots and recording of individual microphones/microphone arrays in the location (or triangulation).

The system may also be trained to detect bullet impacts in human bodies by using recordings of these as the training data. Using the recordings, either model may be expanded to determine a number of victims. It may also be possible to infer the likely damage caused and the approximate placement of the wound (e.g., whether a bullet proof vest is hit, an object is hit by the bullet, or the bullet ricocheted, etc.). This data may be automatically provided to emergency services such as hospitals or ambulances for quicker response times, likely to improve victim outcomes. A number of shots fired (and/or placement information and timing of the shots) may be used to infer an approximate count of casualties. Optionally, it may also be possible to infer a victim count if the impact sounds originate in quick succession from different locations, or if an impact was determined to be a fatality and further shots were fired into different locations.

In some examples, the system may be combined with a similar model using videos and/or still images, which may be a natural combination if the data arrives from a CCTV camera, for example. The video model may use a standard neural network to perform object detection within images/video frames, looking for firearms and their models. By adding a special subset of shapes to the training material where the shapes represent generic gun shapes and not actual guns, the neural network can identify any guns used to fire shots even if the actual gun is not known to the system. Alternatively, a model may be used to perform object detection within a video sequence.

The images and/or video may be pre-processed as discussed above for the audio. Moreover, images (or video streams) from multiple cameras may be combined to create a three-dimensional representation or increase coverage. The data may be converted to black-and-white and object boundaries may be extracted to simplify model processing, for example. Certain areas of the image may be retained and others (such as those beyond a specific depth where the image quality is insufficient) may be excluded. The combined system may be implemented as two discrete models, or a combined model may be created to process both audio and video. The latter may be easier to present to the user in a UI as the data can be presented directly. If using two models, it may be necessary to decide on how to weight the data originating from the different sources. Such a weighted combination may significantly improve the accuracy of the detected firearm model. In addition, it may allow for the detection of firearms that are produced but never discharged, which may be of particular interest in countries/regions where firearms are outlawed in public places. Alternatively, facial recognition may be used to identify the individual and perform a license check for the firearm they have. Furthermore, individuals may be detected through other data sources such as mobile phone triangulation or other identifying marks like tattoos or birthmarks.

Forensic science is able to detect if a specific firearm fired a specific bullet casing due to wear on the barrel that results in a unique deformation of each casing. The unique wear may also lead to differences in the sound of a bullet discharge, which may be inaudible to a human ear but detectable by a computer given sufficient audio quality. Such an individual firearm audio fingerprint may be used to differentiate between and count various guns of the same model used in a crime and to find the instances of previously recorded firearm crimes using these firearms. In an example scenario, a specific firearm may be determined from the audio fingerprint (firearm's or bullets'). The owner's registration information may be looked up once the firearm is determined so that the likely perpetrator can be found. The initial registration information may be cross-checked against facial recognition, mobile phone triangulation, identification of marks, etc. As the likely perpetrator is determined from the license information, the process of detecting the actual perpetrator through these other data sources may be substantially simplified. The data associated with a previous owner or user of the firearm may also be retrieved. Data about the user in this case (and in the other previously mentioned cases above) may be used to inform law enforcement response. Perpetrators who are inferred to have killed many people may be met with an elevated response, for example.

A machine learning model clustering for unsupervised learning (using techniques such as k-means) may be used for audio fingerprinting purposes along with or in addition to other techniques described herein, ultimately generating clusters of firearms by their unique fingerprint. Clustering results and performance may be improved by running the clustering algorithm over the firearm shots detected to be of a specific model, so that clustering of firearm shots from one model against a different one is not attempted. In this case, the model for detecting the firearm model may be used first to perform detection. Then, the clustering model for that specific firearm model may be used to find the specific firearm employed.

In some examples, additional analyses may subsequently be performed on the clustered data. For example, the waveform shapes may be compared manually or automatically to ensure greater confidence. The information may also be validated through existing, accepted forensic science techniques such as bullet casing analysis. In the latter case, linked crimes that may otherwise have been missed if relying solely on bullet-casing analysis may be detected through the machine learning approach. The clustering may assist crime investigation, when different crimes can be quickly linked together to consolidate the investigations and ultimately accelerate their resolution.

In other examples, audio (or other) data may be obtained after the fact. For example, a firearm may be found discarded following a crime. The firearm may be discharged in a forensic laboratory and the recording may then be fed into the system to find crimes committed with that weapon.

In further examples, a system according to embodiments may also be used to detect other characteristics of crimes. For example, the sounds of a particular model of firearm may be grouped to infer that these are likely to signify certain crimes (e.g., terrorist attacks as opposed to gang violence). The crime type may be used to determine the priority for sending personnel to the crime scene. Crime type (and other information) may be used for sending broadcast alerts to mobile phone users in the region to warn them of danger, for example. The crime type may also be used for determining what type of personnel to send. For example, heavily armed personnel may be required in certain cases. This may also apply to information determined/inferred on the firearm type/explosion size discussed above. To accomplish the crime type linking, the models discussed above may be augmented to take a further vector during training. The additional vector may behave similarly to the firearm model vector and may encode the crime type. This may be generated by the model during evaluation and may be interpreted similarly to the firearm model vector. It may also be possible to just take the firearm model output of the machine learning models and feed the output into another model trained solely on the link between specific firearm models and crime types. Yet another example may be to generate/maintain a table mapping firearm types to crime types with or without employing machine learning approaches.

In yet other examples, a system according to embodiment may be utilized for detecting a type of explosive material and a quantity used in explosions. To detect the quantity, it may be necessary to correct the audio amplitude (volume) to account for distance from the explosion, as different quantities may be differentiated by different amplitudes. The distance may be manually annotated or automated techniques for depth inference from the associated video/images may be used.

Figure 4:
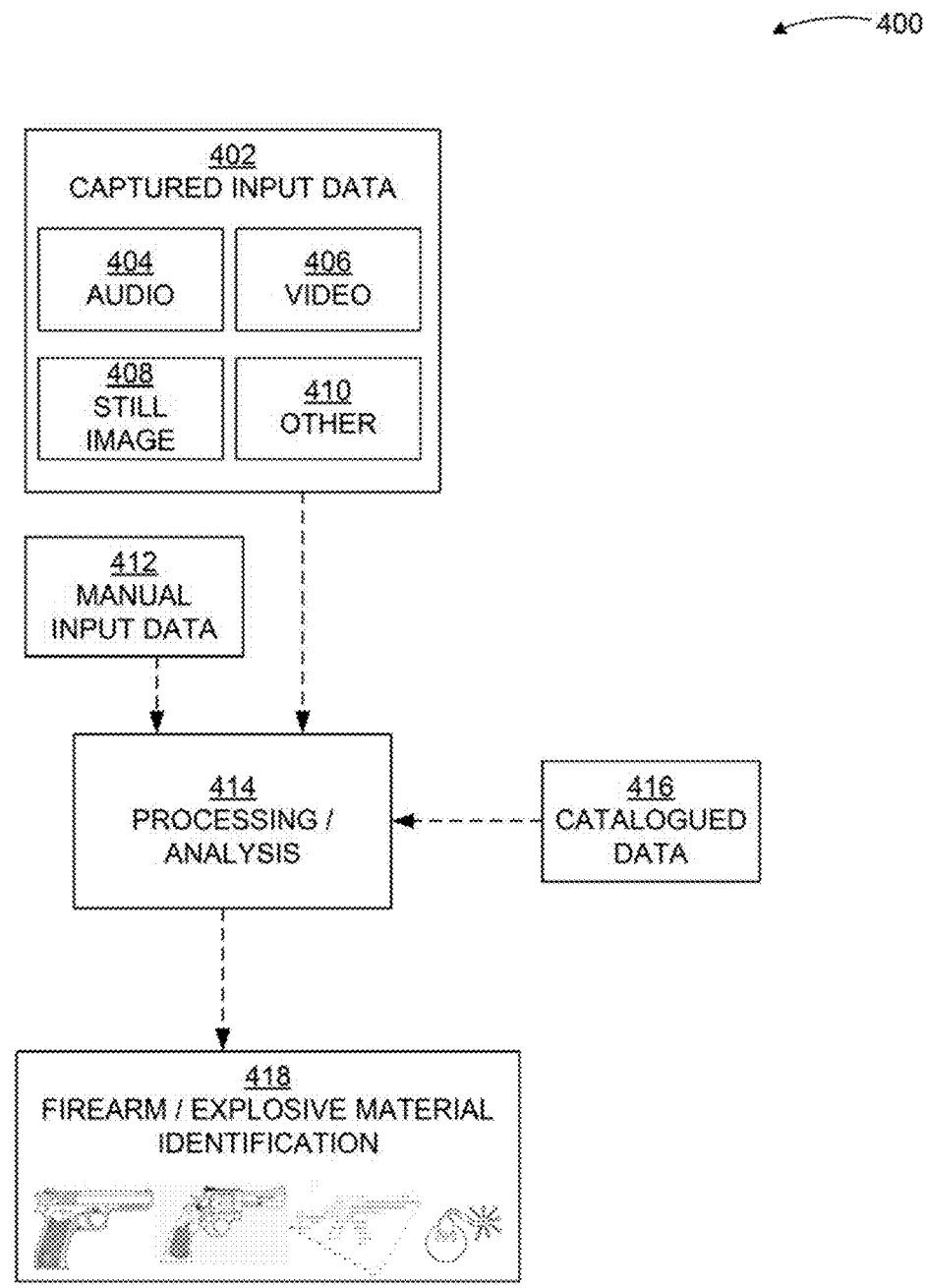
FIG. 4 is a block diagram illustrating example actions in crime scene analysis using machine learning according to embodiments.

FIG. 4 is a block diagram illustrating example actions in crime scene analysis using machine learning according to embodiments.

As shown in diagram 400, captured input data 402 such as audio capture 404, video capture 406, still images 408, and other data 410 (e.g., layout information, witness statements, etc.) may be provided to a machine learning model (continuous or otherwise) 414 for processing and analysis along with manual input data 412 (e.g., crime scene technician inputs, law enforcement official inputs).

The machine learning model 414 may use catalogued data 416 (e.g., pre-recorded audio or images of firearms, etc.) to train and to evaluate input data in order to determine 418 a number, type, model, etc. of one or more firearms used in a crime or explosive materials.

Figure 5:
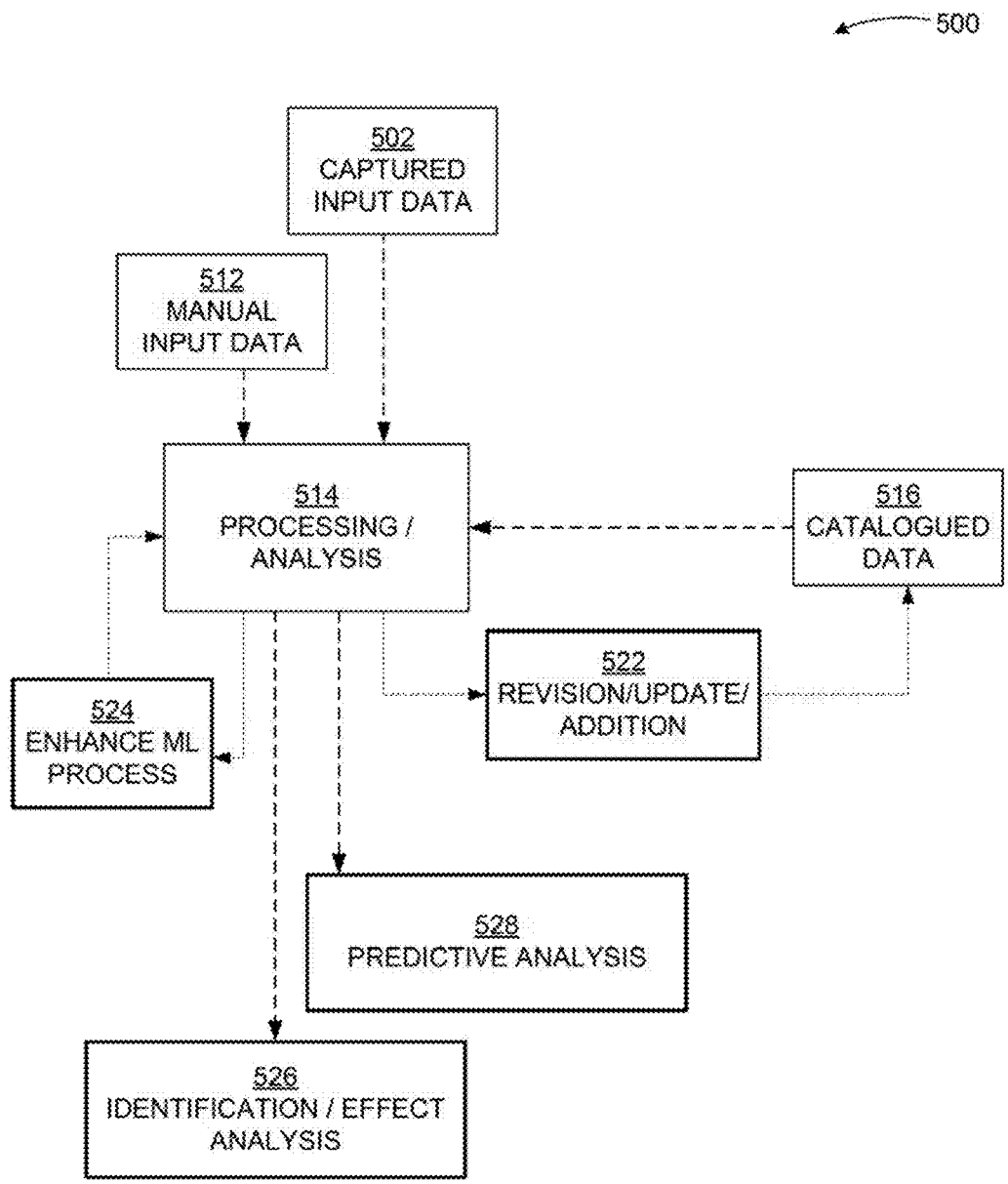
FIG. 5 is a block diagram illustrating example results of crime scene analysis using machine learning according to embodiments.

FIG. 5 is a block diagram illustrating example results of crime scene analysis using machine learning according to embodiments.

A machine learning model 514, as shown in diagram 500, may receive captured input data 502 and manual input data 512, then evaluate the received data in light of catalogued data 516 as discussed in FIG. 4. The machine learning model 514 may be used to identify firearms and/or explosives (526) as discussed herein. In addition, effects of the firearms or explosives such as wounded or killed victims, property damage, etc. may also be analyzed by the model.

The machine learning model may also provide a predictive analysis, for example, linking crime types to specific firearms models, wounds to specific firearms, etc. allowing law enforcement and first responders to adjust their strategies based on available information. Furthermore, results of the analyses may be used to improve the machine learning process through self-feedback. Moreover, revisions or updates may be made to the cataloged data 516 based on the process. For example, new audio captures of firearm shots may be added to a "fingerprint" database, accuracy of existing records may be improved.

Embodiments, as described herein, address a need that arises from a lack of efficiency to provide crime scene analyses manually. The actions/operations described herein are not a mere use of a computer, but address results that are a direct consequence of software used as a service offered to large numbers of users, applications, and large amount of data.

The example scenarios and schemas in FIG. 1 through 5 are shown with specific components, data types, and configurations. Embodiments are not limited to systems according to these example configurations. Providing crime scene analysis using machine learning may be implemented in configurations employing fewer or additional components in applications and user interfaces. Furthermore, the example schema and components shown in FIG. 1 through 5 and their subcomponents may be implemented in a similar manner with other values using the principles described herein.

Figure 6:
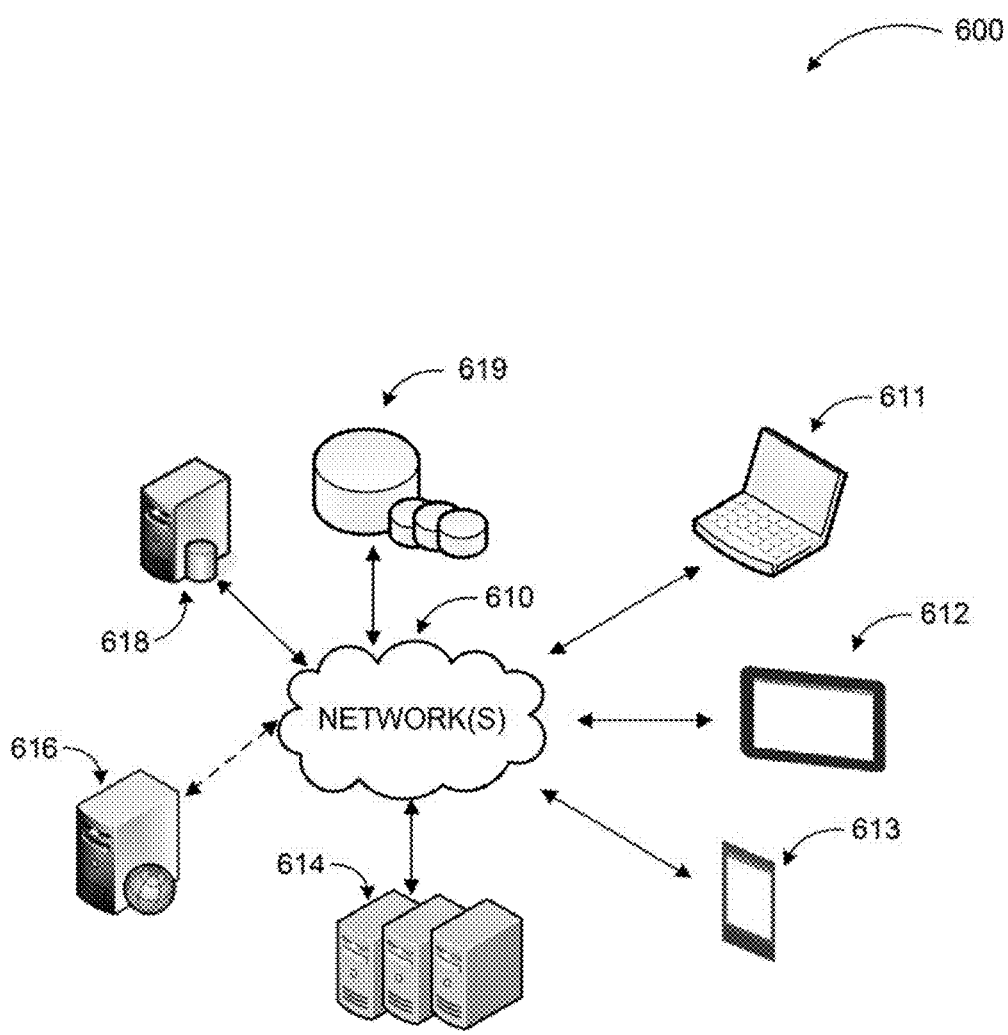
FIG. 6 is a simplified networked environment, where a system according to embodiments may be implemented.

FIG. 6 is an example networked environment, where embodiments may be implemented. A service or application configured to provide crime scene analysis using machine learning may be executed over one or more servers 614. The platform may communicate with client applications on individual computing devices such as a smart phone 613, a mobile computer 612, or laptop computer 611 ('client devices') through network(s) 610.

Client applications executed on any of the client devices 611-613 may facilitate communications via application(s) executed by servers 614, or on individual server 616. A cloud based analysis service executed on servers 614 or individual server 616 may detect firearm models, types, or even specific firearms automatically from captured audio files or continuous audio streams (e.g., recording microphones) using machine learning techniques. The detection may also be based on (or enhanced by) captured still images or video files/streams. Further information such as crime scene layout, wound types and locations, and similar information may be provided to the analysis service through manual input or automated capture (e.g., through analysis of image/video data). Data associated with the previews and previewers may be stored in data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to provide crime scene analysis using machine learning. Furthermore, the networked environments discussed in FIG. 6 are for illustration purposes only. Embodiments are not limited to the example applications, modules, or processes.

Figure 7:
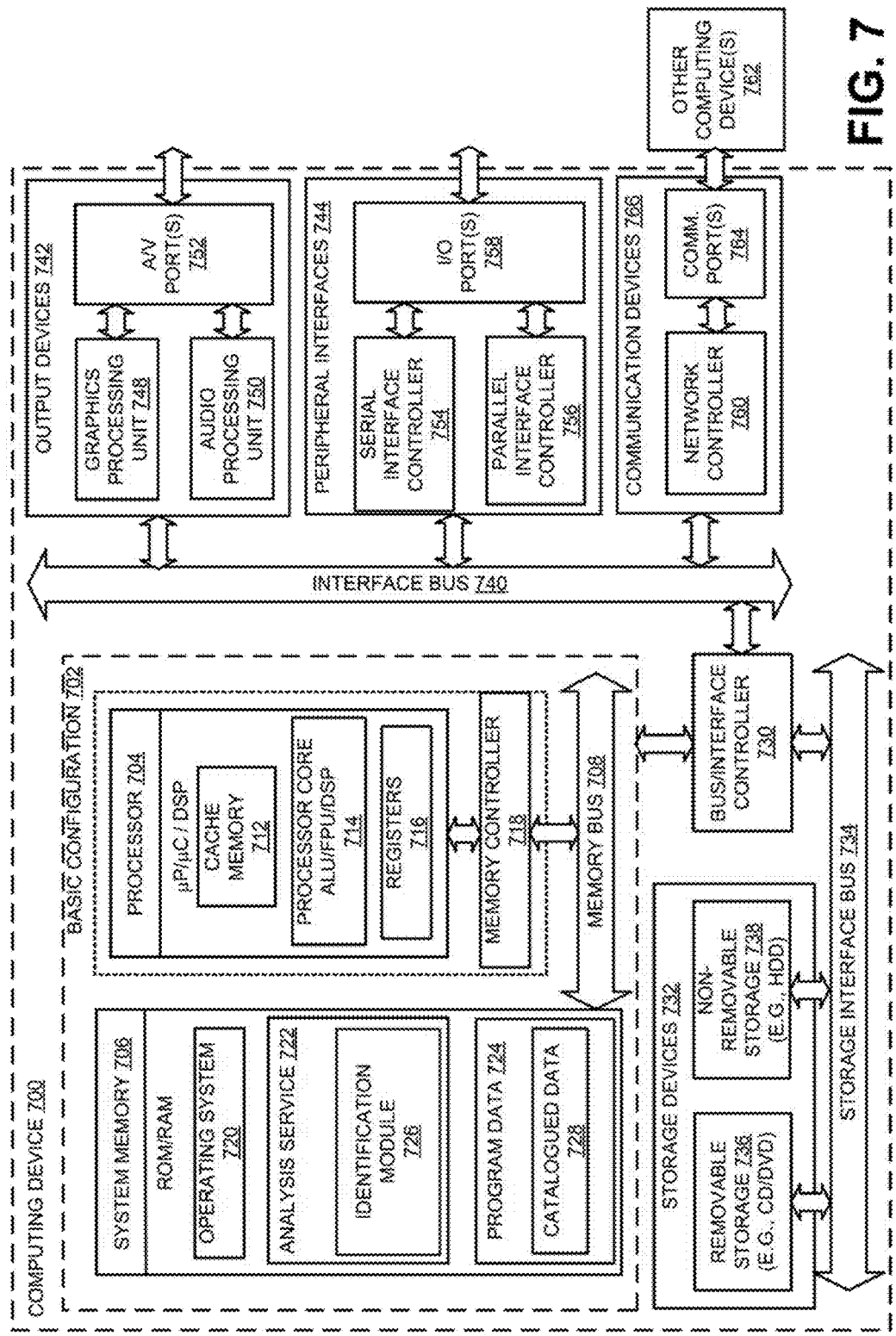
FIG. 7 is a block diagram of an example computing device, which may be used to provide crime scene analysis using machine learning, according to embodiments.

FIG. 7 is a block diagram of an example computing device, which may be used to provide crime scene analysis using machine learning, according to embodiments.

For example, computing device 700 may be used as a server, or similar device. In an example basic configuration 702, the computing device 700 may include one or more processors 704 and a system memory 706. A memory bus 708 may be used for communication between the processor 704 and the system memory 706. The basic configuration 702 may be illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), a graphics processing unit (GPU), or any combination thereof. An example memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, an analysis service 722, and a program data 724. The analysis service 722 may include components such as an identification module 726. The identification module 726 may execute one or more machine learning processes associated with providing crime scene analysis and identification of firearms and/or explosive materials as described herein. The program data 724 may also include, among other data, catalogued data 728 such as audio or visual recordings of firearms, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 766) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example of the communication device(s) 766 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a specialized server, mainframe, or similar computer, which includes any of the above functions. The computing device 700 may also be implemented as a personal computer including both laptop computer and non-laptop computer configurations. Additionally, the computing device 700 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to provide crime scene analysis using machine learning. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
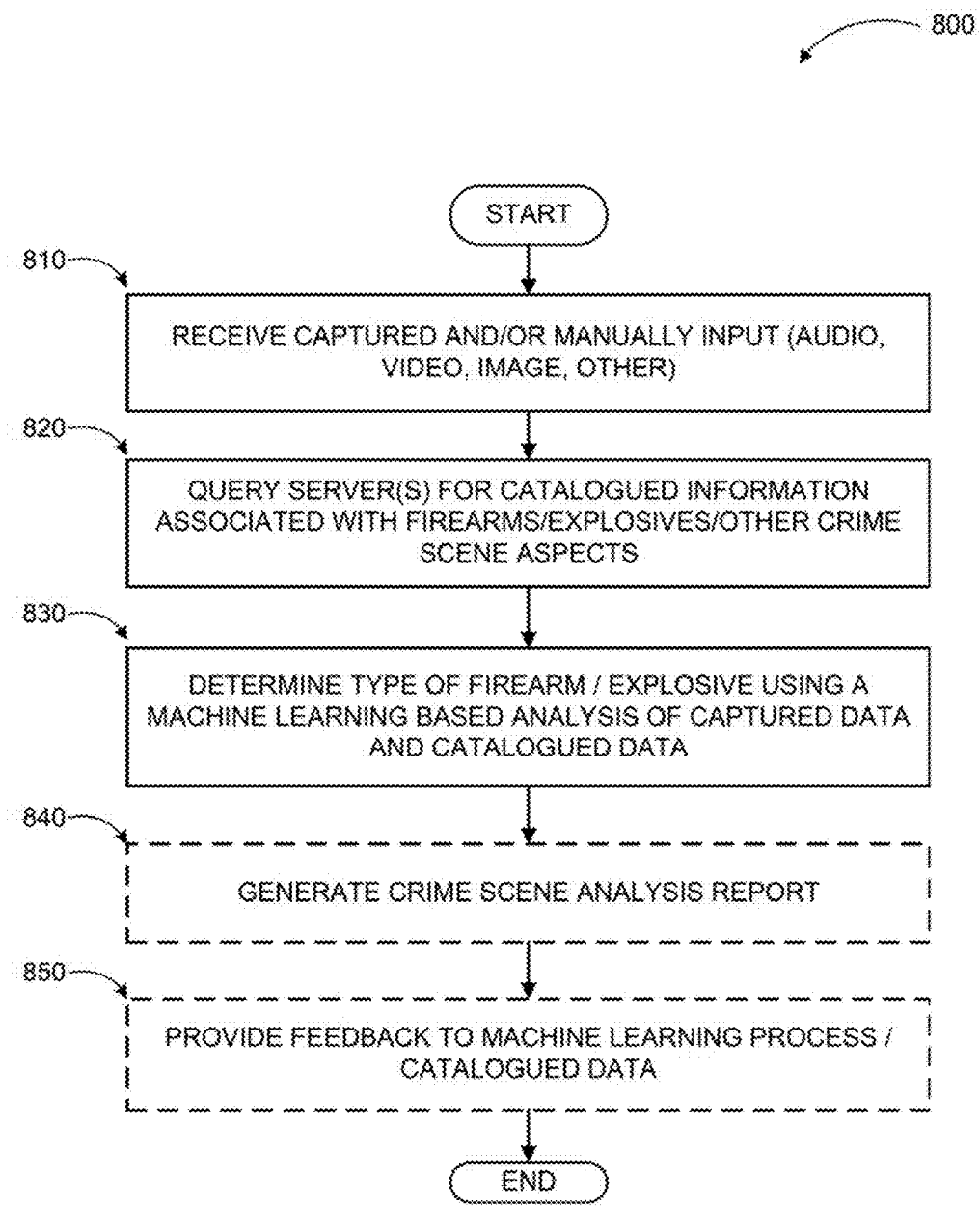
FIG. 8 is a logic flow diagram illustrating a process for providing crime scene analysis using machine learning, according to embodiments.

FIG. 8 is a logic flow diagram illustrating a process for providing crime scene analysis using machine learning, according to embodiments. Process 800 may be implemented on a computing device, such as the computing device 700 or another system.

Process 800 begins with operation 810, where an analysis service may receive captured and/or manually input data associated with a crime scene such as audio data, video data, still image(s), and other data. One or more servers may be queried for catalogued information associated with firearms, explosive materials, and/or other crime scene aspects at operation 820. For example, characteristic shot sounds of different firearm models may be queried to determine a firearm used at a crime scene based on a captured audio of the firearm shot(s). The analysis service may then determine the type of or the specific firearm or explosive material using a machine learning approach based on the captured data and the catalogued information at operation 830. Results may include identification of firearms or explosives used in the commission of a specific crime, a comprehensive analysis of the crime scene (optional operation 840), and/or feedback to the machine learning process or the catalogued information database to enhance accuracy (optional operation 850).

The operations included in process 800 is for illustration purposes. Providing crime scene analysis using machine learning may be implemented by similar processes with fewer or additional steps, as well as in a different order of operations using the principles described herein. The operations described herein may be executed by one or more processors operated on one or more computing devices, one or more processor cores, specialized processing devices, and/or special purpose processors, among other examples.

According to examples, a means for providing automated crime scene analysis using machine learning is described. The means may include a means for receiving captured data associated with use of one or more of a firearm or an explosive material in a crime scene environment; a means for querying a server for catalogued data associated with a plurality of firearms or explosive materials; a means for evaluating the received captured data at a machine learning model in light of the catalogued data to identify the one or more of the firearm or the explosive material; and a means for providing the identification to a designated recipient.

According to some examples, a method for automated crime scene analysis using machine learning is described. The method may include receiving captured data associated with use of one or more of a firearm or an explosive material in a crime scene environment; querying a server for catalogued data associated with a plurality of firearms or explosive materials; evaluating the received captured data at a machine learning model in light of the catalogued data to identify the one or more of the firearm or the explosive material; and providing the identification to a designated recipient.

According to other examples, evaluating the received captured data in light of the catalogued data may include training the machine learning model based on the catalogued data; and evaluating the received captured data to identify the firearm or the explosive material with the trained machine learning model. The method may also include one or more of automatically or manually pre-processing the captured data to optimize the evaluation. The method may further include providing as output of the machine learning model one or more of a firearm model, a firearm type, an explosive material type, or a confidence parameter based on the captured data; providing an update to one or more of a crime scene analysis database or a catalogued data store; or providing feedback to the machine learning model based on a result of the evaluation to enhance an accuracy of the machine learning model.

According to further examples, the captured data may include one or more of audio data, video data, still image data, topographical data, crime scene layout data, wound type data, or wound location data. The method may also include employing a continuous machine learning model as the machine learning model, where the continuous machine learning model is trained by inputting the captured data in continuous form. The continuous machine learning model may be configured to use a history of a preceding interval before each interval to determine whether a current interval contains a firearm shot. Identifying the firearm or the explosive material may include identifying one or more of a type of the firearm, a number of firearms used, a model of the firearm, a type of the explosive material, and an amount of the explosive material.

According to other examples, a method for automated crime scene analysis using machine learning is described. The method may include training a machine learning model based on one or more of pre-recorded audio or visual information associated with a plurality of firearms; receiving captured one or more of audio or visual data associated with use of a firearm in a crime scene environment; evaluating the captured data to identify the firearm with the trained machine learning model; and providing one or more of the identification, a comprehensive crime scene analysis report, and a feedback report to one or more designated recipients.

According to some examples, evaluating the received audio and visual data may include employing two machine learning models for evaluating the captured audio data and the captured visual data; and combining results from the two machine learning models in a weighted manner. Evaluating the received audio and visual data may also include employing a combined machine learning model for both the captured audio data and the captured visual data. The method may further include inferring one or more of a victim count, a wound placement on each victim, and a likely damage based on the evaluation of the captured data; and providing a notification to first responder services. The method may also include inferring a number of firearms used in the crime scene environment based on audio data captured through one or more microphones, microphone arrays, and spatial configuration information associated with the microphone arrays. The method may further include upon identifying a number and a type of the firearms used in the crime scene environment, inferring a crime type based on the number and the type of the firearms; and providing a notification to first responder services.

According to further examples, a server configured to provide automated crime scene analysis using machine learning is described. The server may include a communication device configured to facilitate communication between the server, a cloud storage, and a client device; a memory configured to store instructions; and one or more processors coupled to the memory and the communication device, where the one or more processors, in conjunction with the instructions stored in the memory, execute an identification module of an analysis service. The identification module may be configured to train a machine learning model based on pre-recorded audio and visual information associated with a plurality of firearms received from the cloud storage; receive captured audio and visual data associated with use of a firearm in a crime scene environment; evaluate the received audio and visual data to identify the firearm with the trained machine learning model; and provide one or more of the identification, a comprehensive crime scene analysis report, and a feedback report to one or more designated recipients.

According to yet other examples, the identification module may be further configured to employ a continuous machine learning model configured to use a history of a preceding interval before each interval to determine whether a current interval contains a firearm shot with greater weights applied to more recent intervals than intervals that are further away. The identification module may also be configured to provide continuous audio and visual data to the machine learning model; and receive as output a presence or a no-presence of a firearm era firearm model at each interval. The identification module may be further configured to determine a specific firearm based on an associated audio fingerprint.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for automated crime scene analysis using machine learning, the method comprising:
   receiving captured data associated with use of one or more of a firearm or an explosive material in a crime scene environment;
   querying a server for catalogued data associated with a plurality of firearms or explosive materials;
   evaluating the received captured data at a machine learning model using the catalogued data to identify a model of the one or more firearms or the explosive material, wherein the machine learning model was trained with at least data including audio files of firearm shots tagged with the model of the one or more firearms; and
   providing the identification to a designated recipient.

2. The method of claim 1, wherein evaluating the received captured data using the catalogued data further comprises:
   training the machine learning model based on the catalogued data; and
   evaluating the received captured data to identify the model of the one or more firearms or the explosive material with the trained machine learning model.

3. The method of claim 2, further comprising:
   one or more of automatically or manually pre-processing the captured data to optimize the evaluation.

4. The method of claim 1, further comprising:
   providing as output of the machine learning model one or more of a firearm model, a firearm type, an explosive material type, or a confidence parameter based on the captured data.

5. The method of claim 1, further comprising:
   providing an update to one or more of a crime scene analysis database or a catalogued data store.

6. The method of claim 1, further comprising:
   providing feedback to the machine learning model based on a result of the evaluation to enhance an accuracy of the machine learning model.

7. The method of claim 1, wherein the captured data includes one or more of audio data, video data, still image data, topographical data, crime scene layout data, wound type data, or wound location data.

8. The method of claim 7, further comprising:
   employing a continuous machine learning model as the machine learning model, wherein the continuous machine learning model is further trained by inputting the captured data in continuous form.

9. The method of claim 8, wherein the continuous machine learning model is configured to use a history of a preceding interval before each interval to determine whether a current interval contains a firearm shot.

10. The method of claim 1, wherein identifying the one or more firearms or the explosive material further comprises:
    identifying one or more of a type of the firearm, a number of firearms used, a type of the explosive material, and an amount of the explosive material.

11. A method for automated crime scene analysis using machine learning, the method comprising:
    training a machine learning model based on one or more of pre-recorded audio or visual information associated with a plurality of firearms, wherein the pre-recorded audio including at least audio files of firearm shots tagged with a model of the one or more firearms;
    receiving captured one or more of audio or visual data associated with use of a firearm in a crime scene environment;
    evaluating the captured data to identify the model of the firearm with the trained machine learning model; and
    providing one or more of the identification, a comprehensive crime scene analysis report, and a feedback report to one or more designated recipients.

12. The method of claim 11, wherein evaluating the received audio and visual data comprises:
    employing two machine learning models for evaluating the captured audio data and the captured visual data; and
    combining results from the two machine learning models in a weighted manner.

13. The method of claim 11, wherein evaluating the received audio and visual data comprises:
    employing a combined machine learning model for both the captured audio data and the captured visual data.

14. The method of claim 11, further comprising:
inferring one or more of a victim count, a wound placement on each victim, and a likely damage based on the evaluation of the captured data; and
providing a notification to first responder services.

15. The method of claim 11, further comprising:
inferring a number of firearms used in the crime scene environment based on audio data captured through one or more microphones, microphone arrays, and spatial configuration information associated with the microphone arrays.

16. The method of claim 11, further comprising:
upon identifying a number and a type of the firearms used in the crime scene environment, inferring a crime type based on the number and the type of the firearms; and
providing a notification to first responder services.

17. A server configured to provide automated crime scene analysis using machine learning, the server comprising:
a communication device configured to facilitate communication between the server, a cloud storage, and a client device;
a memory configured to store instructions; and
one or more processors coupled to the memory and the communication device, wherein the one or more processors, in conjunction with the instructions stored in the memory, execute an identification module of an analysis service, the identification module configured to:
train a machine learning model based on pre-recorded audio and visual information associated with a plurality of firearms received from the cloud storage, wherein the pre-recorded audio including at least audio files of firearm shots tagged with a model of the one or more firearms;
receive captured audio and visual data associated with use of a firearm in a crime scene environment;
evaluate the received audio and visual data to identify the model of the firearm with the trained machine learning model; and
provide one or more of the identification, a comprehensive crime scene analysis report, and a feedback report to one or more designated recipients.

18. The server of claim 17, wherein the identification module is further configured to:
employ a continuous machine learning model configured to use a history of a preceding interval before each interval to determine whether a current interval contains a firearm shot with greater weights applied to more recent intervals than intervals that are further away.

19. The server of claim 17, wherein the identification module is further configured to:
provide continuous audio and visual data to the machine learning model; and
receive as output a presence or a no-presence of a firearm or a firearm model at each interval.

20. The server of claim 17, wherein the identification module is further configured to:
determine a specific firearm based on an associated audio fingerprint.

* * * * *